US010037512B2

(12) United States Patent
White et al.

(10) Patent No.: US 10,037,512 B2
(45) Date of Patent: Jul. 31, 2018

(54) CALENDAR EVENT COMPLETION (71) Applicant: Apple Inc., Cupertino, CA (US)

(72) Inventors: Kenneth S. White, San Francisco, CA (US); Viktor Miladinov, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 586 days.

(21) Appl. No.: 14/292,544

(22) Filed: May 30, 2014

(65) Prior Publication Data
US 2015/0347980 A1 Dec. 3, 2015

(51) Int. Cl.
*G06Q 10/10* (2012.01)
(52) U.S. Cl.
CPC .................. *G06Q 10/1095* (2013.01)
(58) Field of Classification Search
None
See application file for complete search history.

(56) References Cited

U.S. PATENT DOCUMENTS

| | | | | |
|---|---|---|---|---|
| 7,092,929 | B1* | 8/2006 | Dvorak | G06Q 10/087 |
| | | | | 705/28 |
| 2005/0222971 | A1* | 10/2005 | Cary | G06Q 10/109 |
| 2009/0198728 | A1* | 8/2009 | Davia | G06Q 10/109 |
| 2011/0184768 | A1* | 7/2011 | Norton | G06Q 10/02 |
| | | | | 705/5 |
| 2012/0030194 | A1* | 2/2012 | Jain | G06F 3/0481 |
| | | | | 707/722 |
| 2012/0278129 | A1* | 11/2012 | Salomatin | G06Q 10/06 |
| | | | | 705/7.31 |
| 2013/0282833 | A1* | 10/2013 | Chattopadhyay | H04L 65/403 |
| | | | | 709/206 |
| 2014/0128021 | A1* | 5/2014 | Walker | H04W 52/0212 |
| | | | | 455/405 |

* cited by examiner

*Primary Examiner* — Thomas L Mansfield
(74) *Attorney, Agent, or Firm* — Dickinson Wright RLLP (57) ABSTRACT

Methods and systems that provide for enhanced and simplified calendar event creation in a calendar application are disclosed. First, the method begins with a user inputting into a device a description of a new calendar event. Second, the method uses the description to extract a title field that is then used to scan for a list of similar calendar events from a database of historical calendar events. Third, the method presents the list of similar calendar events to the user. Fourth, the user selects one of the similar calendar events to help pre-fill some or all of the fields of the new calendar event.

20 Claims, 8 Drawing Sheets

CALENDAR EVENT COMPLETION

FIELD

The described embodiments relate generally to methods and systems that provide for a calendar application, and more particularly to methods and systems that provide for enhanced and simplified calendar event creation in a calendar application.

BACKGROUND

For a calendar application, creating a new calendar event is often complicated and hard to do, involving many steps for inputting data. For example, to create a new calendar event for a workplace group meeting, a user has to input an event title or description, such as "Design team review meeting". Then the user needs to select a date for the event, set a start and end time for the event, add all the invitees for this event, decide which calendar (or category) this event should belong to, add alarm, add notes, add attachments, plus other possible steps. The net result is a very involved and tedious process for creating a new calendar event, consisting of many steps and many fields of data to be entered. Additionally, with a lot of data input, the new calendar event creation process may be prone to error. For example, there may be typographical errors, or, if the list of invitees to a meeting is very long, an invitee may be inadvertently left out.

Therefore, it is desirable to have an enhanced and simplified method for creating a new calendar event, where some or all of event entry steps or data might be pre-filled or autocompleted by a calendar application.

SUMMARY

In summary, this disclosure describes an enhanced and simplified method for creating a new calendar event, where some or all of new event data are pre-filled or populated by a calendar application using historical calendar events. The method begins with a user inputting into a device a description of the new calendar event. This description is then used to scan a database of historical calendar events for a list of similar calendar events that can be used to help pre-filled or populated the new calendar event entry.

In particular, this specification describes various embodiments that relate to methods and systems that provide for enhanced and simplified calendar event creation in a calendar application. In one embodiment, a user might be creating certain types of calendar events over and over again, so there is an opportunity to re-use some of the historical calendar event data to populate or pre-fill a new calendar event entry. In one embodiment, the user begins by inputting some initial data describing a new calendar event to a calendar application. As examples, this initial data can include a title (or description or subject) of the new calendar event, a part of a title of the new calendar event, or a part of a title of the new calendar event plus a date and a time. As further examples, this initial data can include a name or a part of a name of an invitee of the new calendar event, or any information associated with the new calendar event. In response to this initial data input, the calendar application can extract a title (or some other field) of the new calendar event from this initial data input, and use the extracted title to scan a database of historical calendar events for a list of similar (and possibly related) calendar events. Then calendar application can present this list of similar (and possibly related) calendar events to the user, so that one of these similar calendar events can be selected to help in creating the new calendar event. In particular, the calendar event that is selected can be used to help populate or pre-fill some or all of the fields of the new calendar event. In one embodiment, this selection can be used to help populate the invitee list for a meeting, and then the calendar application can further suggest possible date and time slots when all the people on the invitee list are available. In one embodiment, the calendar application can use earlier (i.e., historical) calendar events to engage in machine learning that allows the calendar application to learn a user's habits and patterns, and in turn "intelligently" predict possible event data that the user may desire and suggest these possible event data to the user. In other words, the machine learning allows the calendar application to use the historical calendar events of the user to "intelligently" predict future calendar events that the user is most likely to be creating.

In one embodiment, a method for enhancing calendar event creation is disclosed. The method includes a user inputting a description of a new calendar event, a device extracting a first field of the new calendar event from the description, the device using the first field of the new calendar event to scan for a list of similar calendar events from a plurality of historical calendar events, the device presenting the list of similar calendar events to the user, the user selecting one similar calendar event from the list of similar calendar events, and the device using the one selected similar calendar event for populating at least a second field of the new calendar event. In one embodiment, the first field of the new calendar event includes a title of the new calendar event. In one embodiment, the second field of the new calendar event includes at least one of the following: a start time, an end time, an event time duration, a day in a week, a location, an invitee, a calendar category, a note, and an attachment. In one embodiment, the second field of the new calendar event includes an invitee, and the method further includes the device presenting an event meeting time that is available for all invitees to the new calendar event. In one embodiment, the method further includes the user inputting the following fields of the new calendar event: a date, a start time, and an end time. In one embodiment, the method further includes the device extracting a location from the description, the device assessing a time correction associated with a second time zone of the location when it is determined that the location belongs to the second time zone that is different from a first default time zone associated with the user, and the device correcting an event time of the new calendar event based on the time correction.

In one embodiment, a computer program product encoded in a non-transitory computer readable medium for enhancing calendar event creation is disclosed. The computer program product includes computer code for receiving a description of a new calendar event that is inputted by a user, computer code for extracting a first field of the new calendar event from the description, computer code for using the first field of the new calendar event to scan for a list of similar calendar events from a plurality of historical calendar events, computer code for presenting the list of similar calendar events to the user, computer code for receiving one similar calendar event that is selected by the user from the list of similar calendar events; and computer code for using the one selected similar calendar event for populating at least a second field of the new calendar event. In one embodiment, the first field of the new calendar event includes a title of the new calendar event. In one embodiment, the second field of the new calendar event includes at least one of the following: a start time, an end time, an event time duration, a day in a week, a location, an invitee, a calendar category, a note, and an attachment. In one embodiment, the second field of the new calendar event includes an invitee, and the computer program product further includes computer code for presenting an event meeting time that is available for all invitees to the new calendar event. In one embodiment, the computer program product further includes computer code for extracting a location from the description, computer code for assessing a time correction associated with a second time zone of the location when it is determined that the location belongs to the second time zone that is different from a first default time zone associated with the user, and computer code for correcting, by the device, an event time of the new calendar event based on the time correction.

In one embodiment, a device for enhancing calendar event creation is disclosed. The device includes means for a user to input a description of a new calendar event, means for extracting a first field of the new calendar event from the description, means for using the first field of the new calendar event to scan for a list of similar calendar events from a plurality of historical calendar events, means for presenting the list of similar calendar events to the user, means for the user to select one similar calendar event from the list of similar calendar events, and means for using the one selected similar calendar event for populating at least a second field of the new calendar event. In one embodiment, the first field of the new calendar event includes a title of the new calendar event. In one embodiment, the second field of the new calendar event includes at least one of the following: a start time, an end time, an event time duration, a day in a week, a location, an invitee, a calendar category, a note, and an attachment. In one embodiment, the second field of the new calendar event includes an invitee, and the device further includes means for presenting an event meeting time that is available for all invitees to the new calendar event.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

For a calendar application, creating a calendar event can be complicated and tedious. To enhance or simplify the calendar event creation process, one approach can be to automate as much as possible the new calendar event creation process. Another approach can be to search for similar (or possibly related) historical calendar events to extract data for creating a new calendar event. With regards to merging these two approaches, one first realizes that a user can be creating certain types of calendar events over and over again. As an example, a user might be regularly scheduling appointments with a particular doctor or dentist. As another example, a user might be scheduling work related meetings with the same team of colleagues in the user's work group. As such, there is a possibility to re-use some of the data from a selected historical calendar event for populating or pre-filling a new calendar event entry that is similar and/or possibly related to the selected historical calendar event. In other words, the calendar application looks at all historical calendar events associated with a user and suggests those events again if it looks like the user is re-creating those events.

Figure 1:
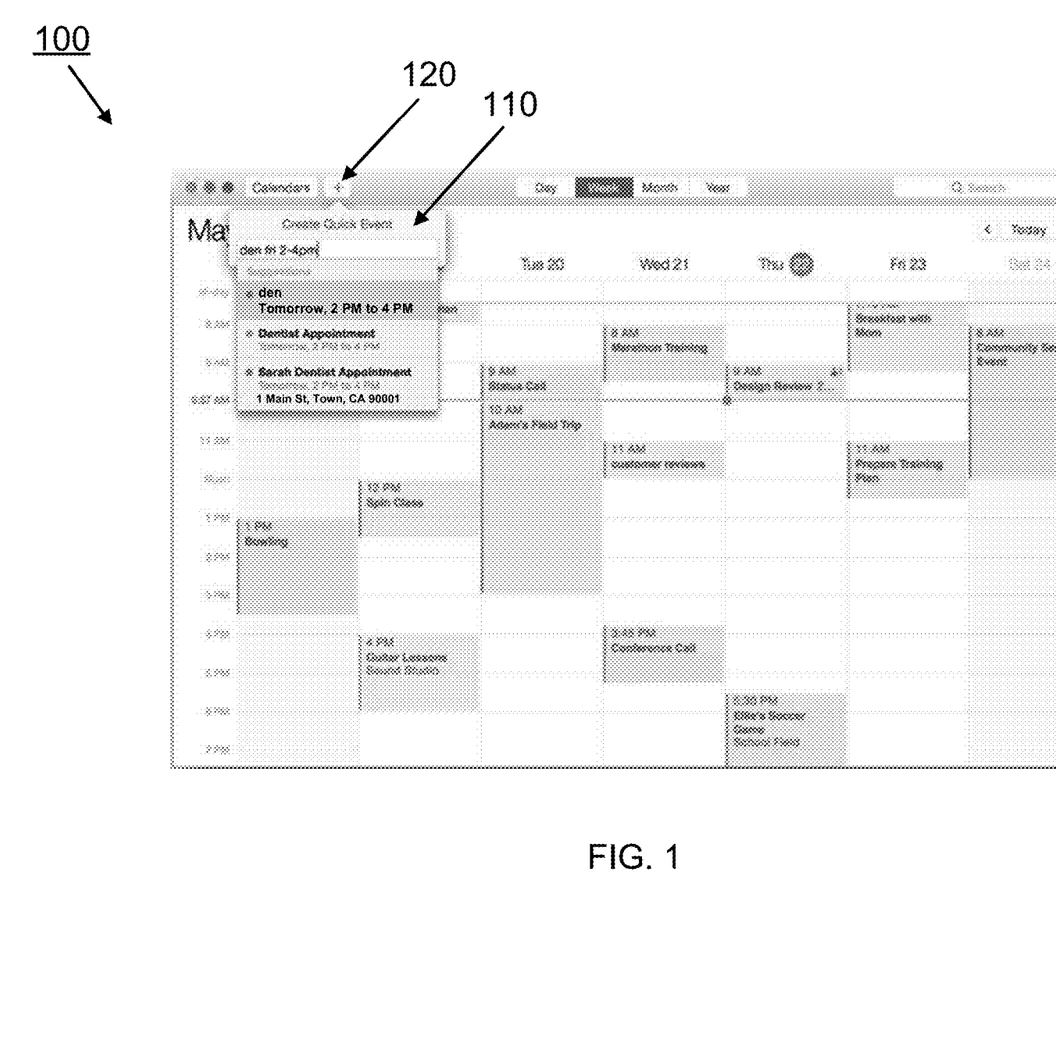
FIG. 1 shows a diagram of a user interface for inputting data describing a new calendar event and returning a suggested list of similar (and possibly related) calendar events to assist in the creation of the new calendar event, in accordance with some example embodiments.

FIG. 1 shows a diagram of an example user interface 100 for a calendar application. FIG. 1 can be used to demonstrate an example method of how a calendar application can utilize a user input describing a new calendar event to scan for similar (and/or possibly related) historical calendar event that might be used by the user to extract data for pre-filling or autocompleting the new calendar event entry. The method begins with a user inputting data describing a new calendar event through a quick event creation window 110. In other embodiments, the calendar application can use other windows or user interfaces to input data describing a new calendar event. In FIG. 1, the quick event creation window 110 is triggered by the user selecting an icon 120, which is labelled "+". In this example, a user wants to create an appointment with the user's dentist on Friday from 2 pm to 4 pm. The user types in a string of text that recites "den fri 2-4 pm" in window 110. First, the calendar application realizes that "fri" refers to Friday, so it suggests the date to be Friday May 23, 2014. Since the user is creating this new calendar event on Thursday May 22, 2014, all the suggestions in window 110 propose using tomorrow, which is Friday May 23, 2014, as the date for the new calendar event. Second, the calendar application realizes that "2-4 pm" refers to a time, so it suggests the time to be 2 pm to 4 pm. Third, the calendar application uses the term "den" to search for similar (or possibly related) calendars from a database of historical calendar events. In one embodiment, the search can be performed using a system-wide desktop search feature of an operating system.

In FIG. 1, the embodiment is to only search for "den" using the title (or description or subject) data field, so that the term "den" might include dentist or any other descriptions related to "den". Examples of data fields for a calendar event can include an event title (or description or subject), an event date, an event start time and an event end time (or an event time duration), an event location, a list of invitees, a calendar category, a note, and an appointment. With regards to a "calendar category" (or sometimes simply referred to as a "calendar"), there can be a different "calendar category" for every member of a user's family or a different "calendar category" to separate different work projects. However, in other embodiments, the search on the database of historical calendar events can be for any other fields or any other combination of fields. For example, the search can be performed using the invitee (or person) field of the historical calendar events, so that the search might end up with historical calendar events associated with any invitee that starts with the term "den", such as "Dennis'. Similarly, the search can be performed using the location field of the historical calendar events, so that the search might end up with historical calendar events associated with any locations that start with the term "den", such as the "Denver conference room".

In one embodiment, typing the input "fri 2-4 pm dent" is the same as typing the input "den fri 2-4 pm". Both inputs will get the same list of suggested historical calendar events from the calendar application. In other words, the calendar application is "intelligent" and can figure out which words correspond to a description of a new event, which words correspond to a date, and which words correspond to a time.

In FIG. 1, typing the input "den fri 2-4 pm" triggers the calendar application to drop down a list of suggested historical calendar events to choose from for pre-filling the new calendar event with the information that the user had previously entered for these suggested historical calendar events. Here, the calendar application makes three suggestions. The first suggestion "den—Tomorrow, 2 PM to 4 PM" is not a historical calendar event. It is a new calendar event that can be created based solely on the data the user has inputted. It can be selected by the user, if the user fails to see any matching historical calendar events. The second and third suggestions, "Dentist Appointment—Tomorrow, 2 PM to 4 PM" and "Sarah Dentist Appointment—Tomorrow, 2 PM to 4 PM—1 Main St, Town, CA 90001", are based on historical calendar events identified by the search. If selected, these suggested historical calendar events can provide all the information previously entered by the user. The previously entered information can include a structured location with a map. It can also include alarms and notes for the user. In the embodiment shown in FIG. 1, the order of the suggested historical calendar events is from "last created event" to "earliest created event", so the first suggestion is the latest event (i.e., most recent) and the last suggestion is the earliest event. In other embodiments, the order of the suggestions can be reversed from FIG. 1, so that the order is from the earliest created event to the latest created event. In that case, the first suggestion is the earliest event and the last suggestion is the latest event (i.e., most recent).

The historical event suggestions shown in window 110 of FIG. 1 can just pop up as the user inputs the description. Therefore, more data can be added to the description input to help improve the search for related historical calendar events. The user can add more letters or more words. For example, more letters can be added to the word "den" to help improve the search. As an example, by typing "dent" or "denti", the search can be improved to focus in on the term "dentist".

Figure 2:
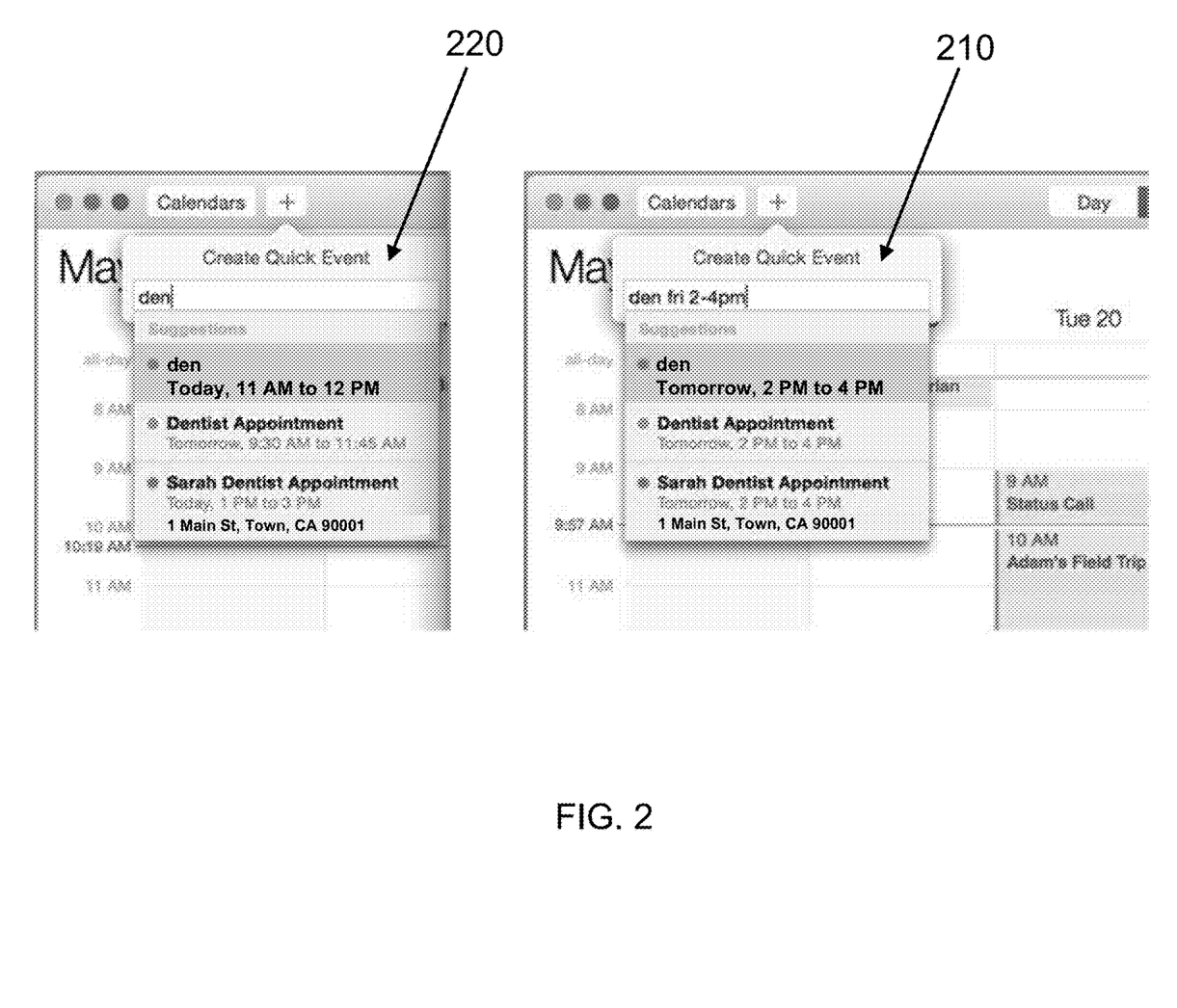
FIG. 2 shows how inputting different data describing a new calendar event can result in the calendar application making different suggestions to assist in the creation of the new calendar event, in accordance with some example embodiments.

FIG. 2 shows how inputting different data describing a new calendar event can result in the calendar application making different suggestions to assist in the creation of the new calendar event, in accordance with some example embodiments. The scenario shown in window 210 corresponds to the user input previously described in FIG. 1. First, the calendar application realizes that "fri" refers to Friday, so it suggests the date to be Friday May 23, 2014. Since the user is creating this new calendar event on Thursday May 22, 2014, all the suggestions in window 110 propose using tomorrow, which is Friday May 23, 2014, as the date for the new calendar event. Second, the calendar application realizes that "2-4 pm" refers to a time, so it suggests the time to be 2 pm to 4 pm. For the scenario shown in window 220, a user only types in "den". No date and time are provided, so the calendar application has to decide what to suggest for the date and time of the new calendar event. There are many possible ways for doing this. One such embodiment is shown in window 220 of FIG. 2 for the first suggestion, "den—Today, 11 AM to 12 PM". Since the user is creating this new calendar event on Thursday May 22, 2014, at 10:19 am, the calendar application decides to suggest the calendar event to begin at the start of the next hour, which corresponds to 11:00 am. Next, the calendar application decides to suggest the event duration to be a default one hour period, so the event ends at 12:00 pm noon time. In other embodiments, the default event duration can be set to a different time period, and the default start time can be set according to different criteria. Further, in some embodiments, these defaults can be configurable by the user, or be based on machine learning that allows the calendar application to "intelligently" learn and predict the preferences of the user. As for the second and third suggestions, "Dentist Appointment—Tomorrow, 9:30 AM to 11:45 AM" and "Sarah Dentist Appointment—Today, 1 PM to 3 PM—1 Main St, Town, CA 90001", those times and dates are based on the times and dates from the historical calendar events themselves. In one embodiment, this means that the last "Dentist Appointment" was scheduled for Friday at 9:30 am to 11:45 am, so the new "Dentist Appointment" is suggested for Friday (i.e., Tomorrow) at 9:30 am to 11:45 am. Similarly, the last "Sarah Dentist Appointment" was scheduled for Thursday at 1:00 pm to 3:00 pm, so the new "Sarah Dentist Appointment" is suggested for Thursday (i.e., Today) at 1:00 pm to 3:00 pm. However, there can be other embodiments for suggesting the date and time.

Figure 3:
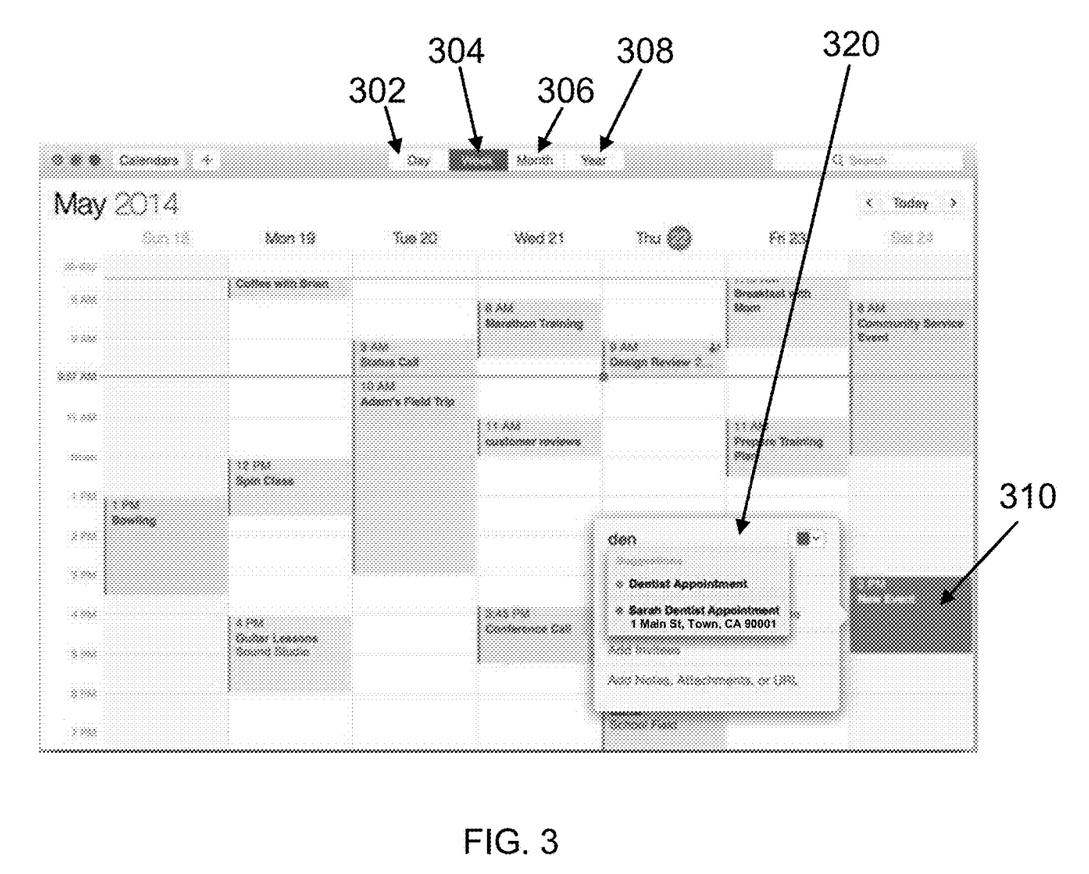
FIG. 3 shows a diagram of a user interface for inputting data describing a new calendar event and returning a suggested list of similar (and possibly related) calendar events to assist in the creation of the new calendar event, where the user has already fixed the date and time of the event, in accordance with some example embodiments.

FIG. 3 shows that the user can fix the date and time of a new calendar event by creating the new calendar event based on a particular time slot on the user interface calendar. FIG. 3 shows that a user interface can display the calendar utilizing a day view, a weekly view, a monthly view, or a yearly view. The selection of the calendar view is based on the icons 302, 304, 306, and 308, which correspond to a day view, a weekly view, a monthly view, and a yearly view, respectively. In FIG. 3, a weekly view has been chosen by selecting icon 304. In FIG. 3, the user chooses a time slot 310 on the calendar, which corresponds to 3 pm to 5 pm on Saturday May 24, 2014. By choosing the time slot 310 for creating a new calendar event, window 320 pops up, allowing a user to input a description for the new calendar event.

In window 320 of FIG. 3, typing the input "den" triggers the calendar application to drop down a list of suggested calendar events to choose from for pre-filling the new calendar event with the information that the user had previously entered for these suggested historical calendar events. Here, the calendar application makes two suggestions. The first and second suggestions, "Dentist Appointment" and "Sarah Dentist Appointment—1 Main St, Town, CA 90001", are based on historical calendar events identified by the search. This is similar to the scenario shown in FIG. 1, except the date and time for the new calendar event are not suggested, because the user has already fixed them through the user's selection on the calendar view of the time slot of 3 pm to 5 pm on Saturday May 24, 2014. Otherwise, the two suggestions based on historical calendar events can include all the information previously entered by the user. This information can include a structured location with a map, as well as alarms and notes for the user. The previous suggestion of "den" is not presented, because not selecting the two suggestions will default the user to the "den" description for the new calendar event. If the two suggestions are not selected, then the user will have to enter all the data for new "den" calendar event, such as a location, alarms, notes, etc.

Figure 4:
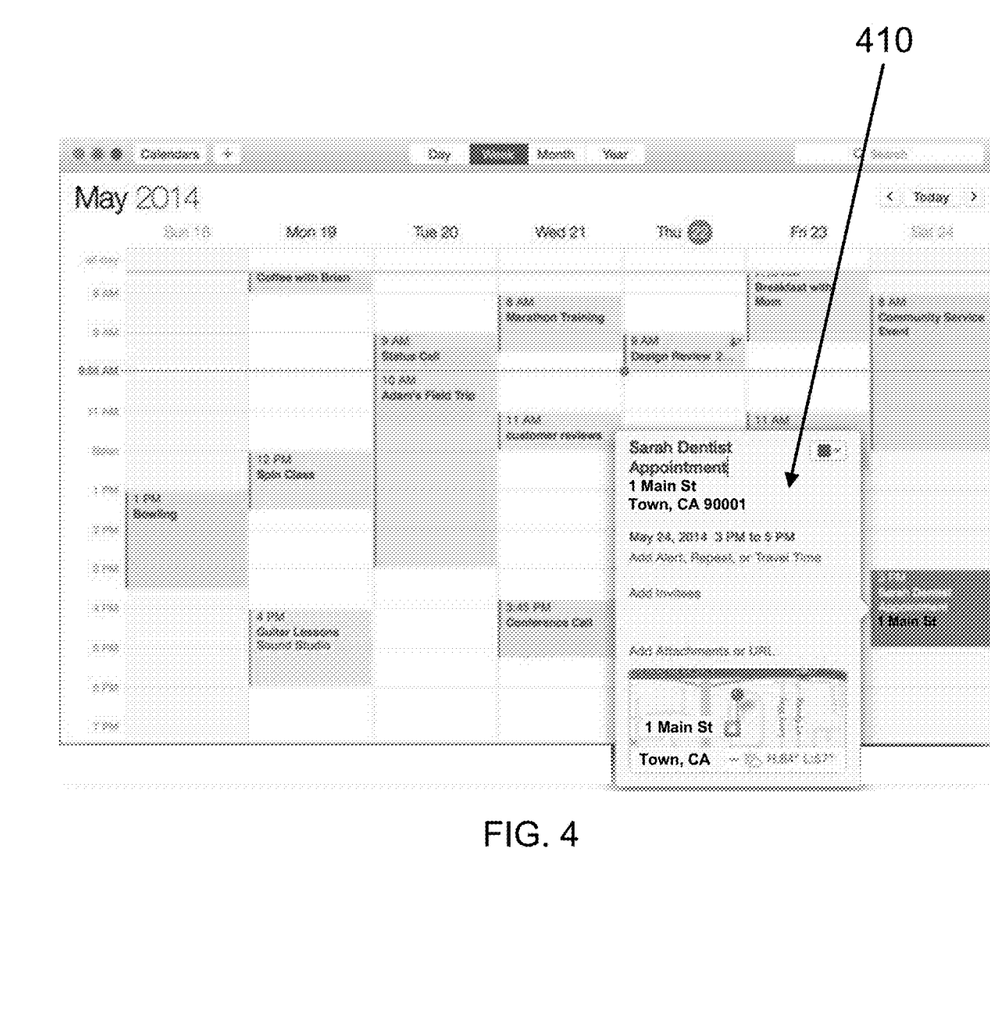
FIG. 4 shows the result of selecting a suggestion from FIG. 3 to help populate or pre-fill fields for creating the new calendar event, in accordance with some example embodiments.

FIG. 4 shows the result of selecting the second suggestion (i.e., "Sarah Dentist Appointment") from FIG. 3 for helping to populate or pre-fill fields for creating the new calendar event, in accordance with some example embodiments. Here, window 410 shows that all the data from the historical calendar event, "Sarah Dentist Appointment", can be used to pre-filling the new calendar event, except for the date and time, since the user has already fixed that. The pre-filled information can include the location, alarms, notes, etc. This pre-filling enhances the calendar event creation experience for the user, because the user has to input less data and, as a result, is less prone to making a mistake in the data entry.

Figure 5:
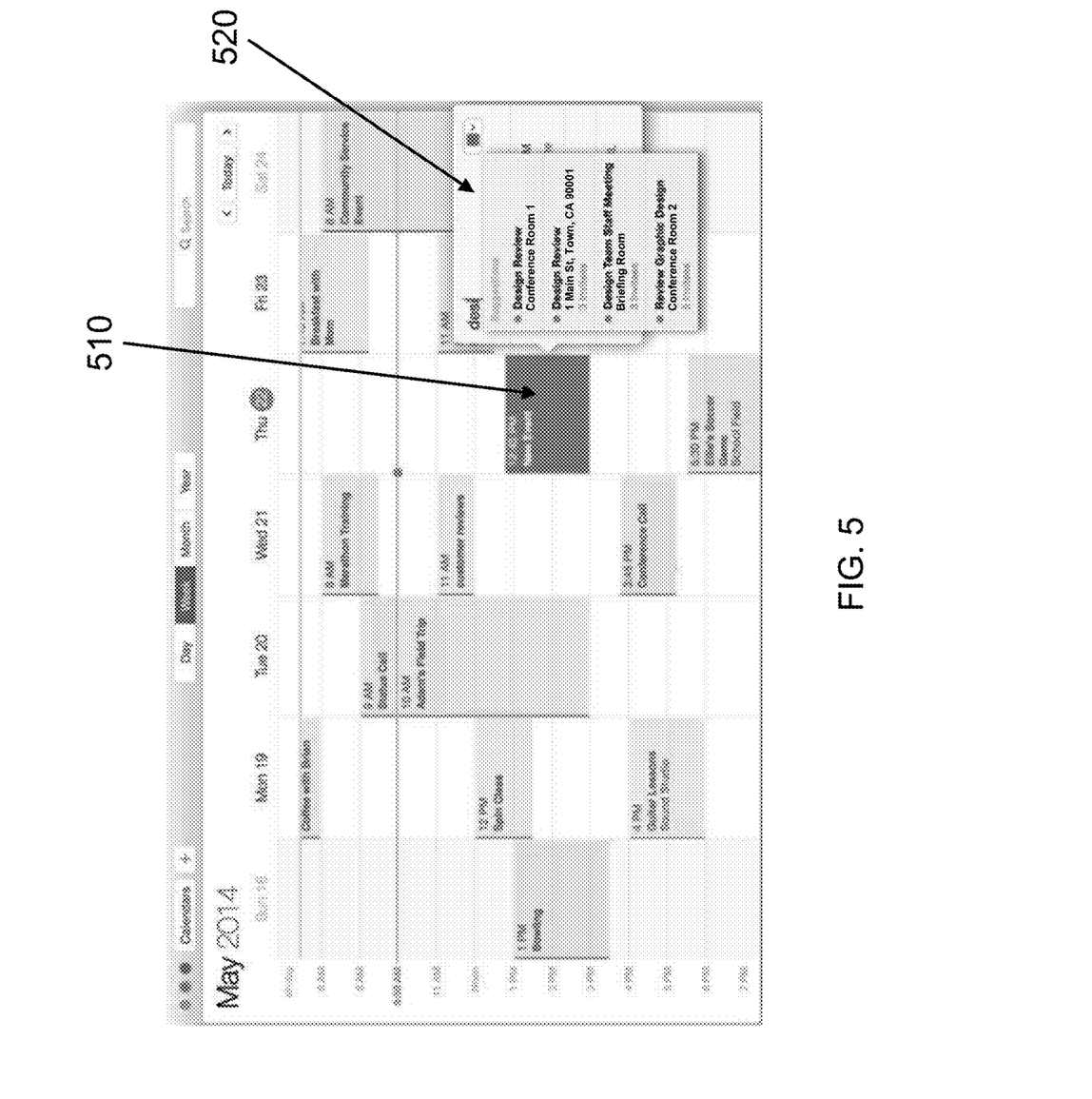
FIG. 5 shows a diagram of a user interface for inputting data describing a new calendar event (that is a meeting) and returning a suggested list of similar (and possibly related) calendar events to assist in the creation of the new calendar event, where the user has already fixed the date and time of the event, in accordance with some example embodiments.

FIG. 5 shows that a user also can use the method and system described above for creating a new calendar event that is a meeting. For example, a user might frequently have to create a meeting at work for design review. For software engineers, this design review can be a meeting to discuss software bugs. This design review is not always a weekly meeting, so there can be a need to create this meeting on the fly, depending on a need to discuss the design among the design team members. Creating this meeting can be tedious and prone to error, as the user tries to add all design team members to the invitee list. In FIG. 5, it can be seen that the user has chosen a time slot 510 on the calendar, which corresponds to 12:45 pm to 3 pm on Thursday May 22, 2014. By choosing the time slot 510 for creating a new calendar event, window 520 pops up, allowing a user to input a description for the new calendar event. In FIG. 5, the user types "desi", and the calendar application responds with a list of suggested historical calendar events to choose from for pre-filling the new calendar event with data that the user had previously entered for these historical calendar events. Here, the calendar application makes four suggestions: "Design Review—Conference Room 1", "Design Review—1 Main St, Town, CA 90001", "Design Team Staff Meeting—Briefing Room", and "Review Graphic Design—Conference Room 2". All four suggestions are based on historical calendar events identified through the search. Again, the date and time for the new calendar event are not suggested, because the user has already fixed them by making a time slot selection on the calendar view for 12:45 pm to 3 pm on Thursday May 22, 2014. Otherwise, all four suggestions based on historical calendar events can include data previously entered by the user. Of course, the user also has the option of not selecting any of the suggestions and proceeding with the "desi" entry that the user has typed into window 520.

Figure 6:
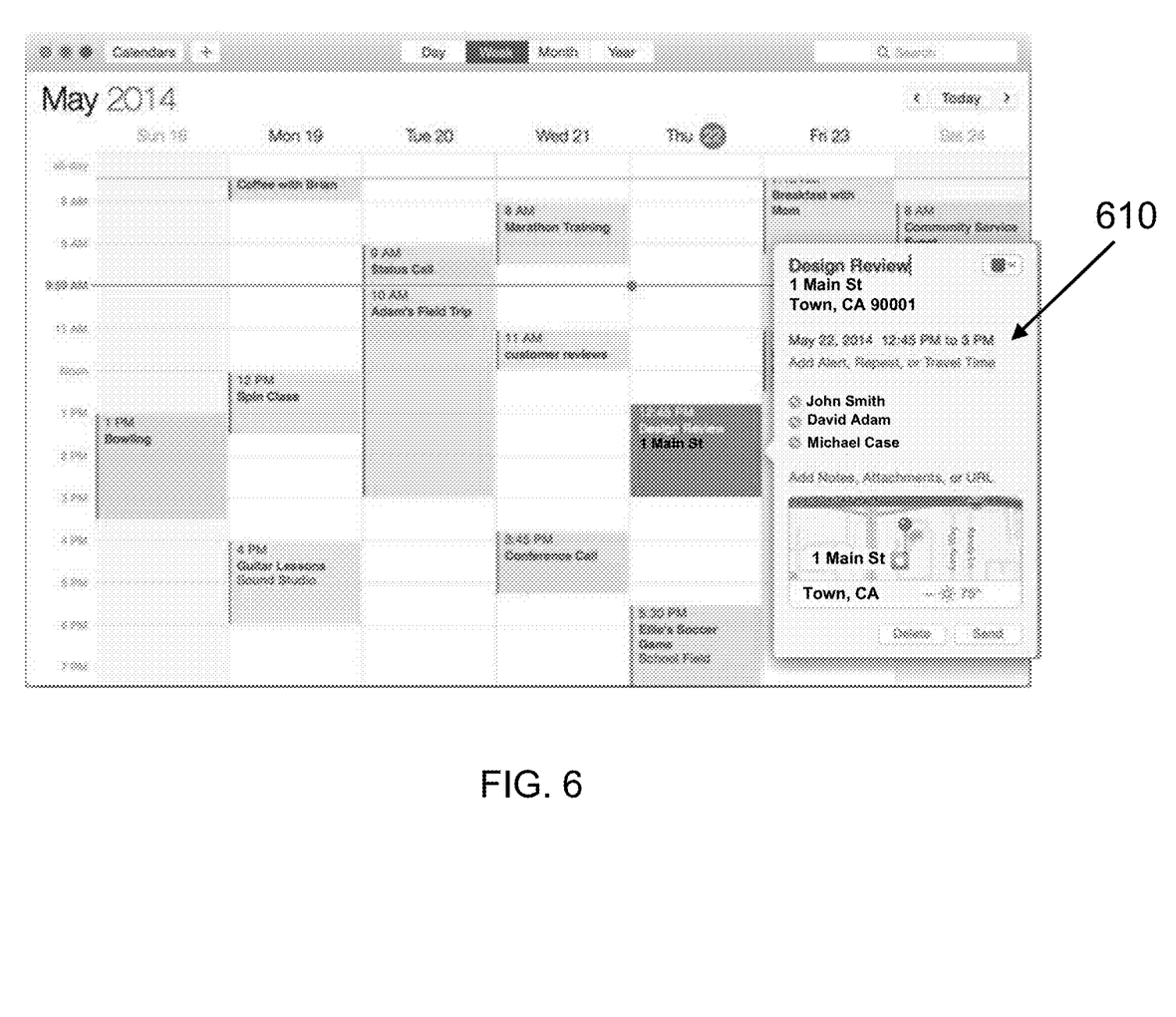
FIG. 6 shows a diagram of the user interface from FIG. 5, after the user has already selected one of the suggested calendar events to help populate fields for creating the new calendar event (that is a meeting), in accordance with some example embodiments.

FIG. 6 shows the result of selecting the second suggestion (i.e., "Design Review—1 Main St, Town, CA 90001") from FIG. 5 for helping to populate fields for creating the new calendar event, in accordance with some example embodiments. Here, window 610 shows that all the data from the historical calendar event, "Design Review—1 Main St, Town, CA 90001", can be used to pre-fill the new calendar event, except for the date and time, since the user has already fixed that. From FIG. 6, it can be seen that the pre-filled information can include the location, the entire invitee list, etc. Very often, the meetings are held in the same room with the same people (i.e., same invitees), so the method and system described can save time, and is less prone to errors because there is less data entry.

As for the pre-filling or copying over of data from the selected historical calendar event, in one embodiment, the default is to copy everything, except for the date, as described previously. In one embodiment, the day of the week for the historical event is copied over and the date for the new event determined using the next occurrence of that day of the week. In other words, if the historical event was entered for Wednesday May 14, 2014, and the new event was being created on Thursday May 22, 2014, then the date for the new event would be determined to be May 28, 2014, which is the next occurrence of Wednesday. In another embodiment, the default is to copy everything, except for the date and time, when the user has already fixed the date and time for the new calendar event. In other embodiments, the default is to copy over only some of the fields. In one embodiment, the repeat rule (e.g., once a week, or once every two weeks) is not copied over. As an example, this embodiment can be desirable for meetings, since not all meetings will have the same repeat rule. In other embodiments, travel time or some other fields are not copied over. Further, in some embodiments, the copy rule for pre-filling new events based on historical events can be configurable by the user. Or, in some embodiments, the copy rule can be based on machine learning that allows the calendar application to "intelligently" learn and predict the preferences of the user.

Figure 7:
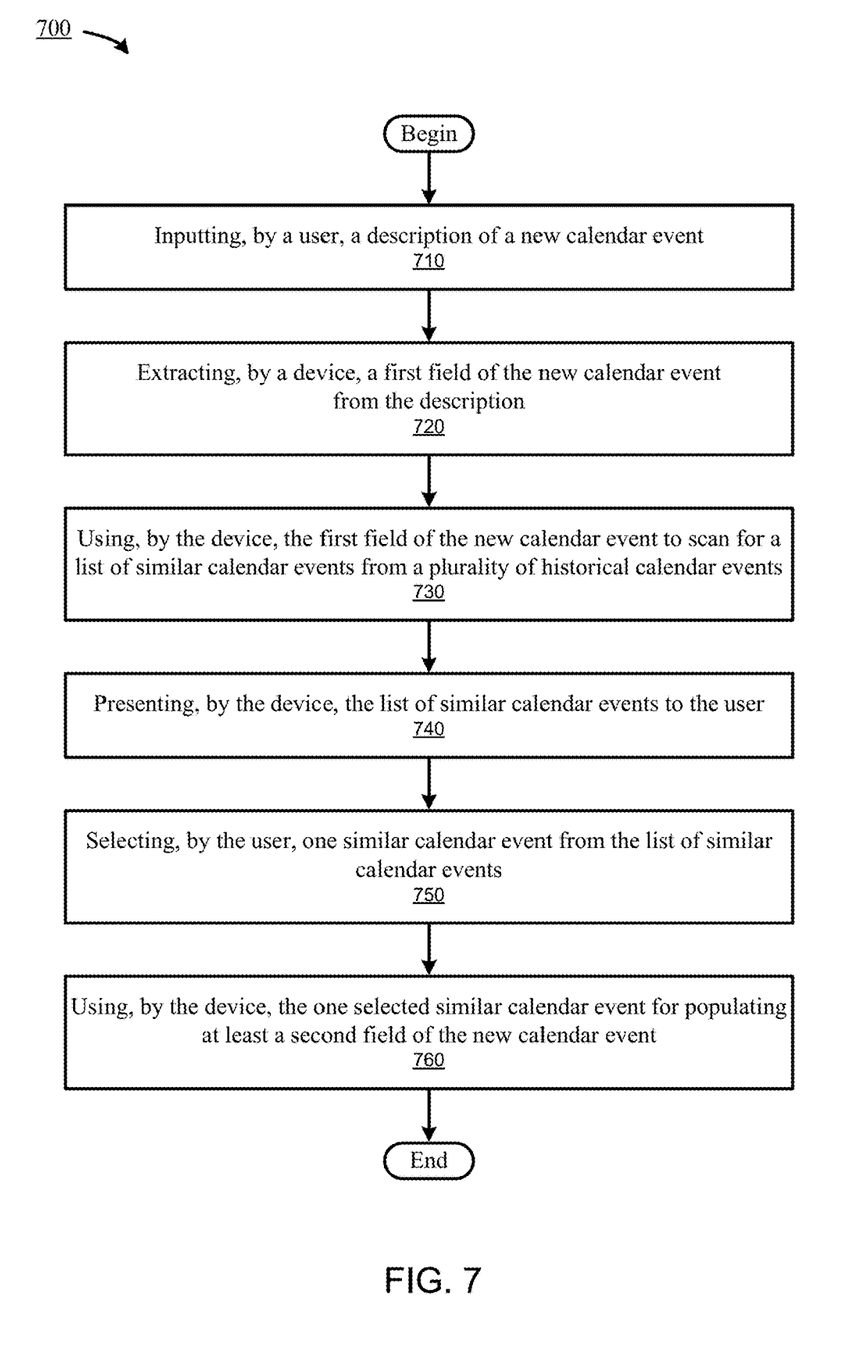
FIG. 7 shows a flow chart of method steps for enhancing the creation of a new calendar event by using data from a selected historical calendar event for pre-filling or autocompleting the new calendar event entry, in accordance with some example embodiments.

FIG. 7 shows a flow chart of method steps for enhancing the creation of a new calendar event by using data from a selected historical calendar event for pre-filling or autocompleting the new calendar event entry, in accordance with some example embodiments. As shown in FIG. 7, the method 700 begins at step 710, where a user inputs a description of a new calendar event. Then, at step 720, a device extracts a first field of the new calendar event from the description. Next, at step 730, the device uses the extracted first field of the new calendar event to scan for a list of similar calendar events from a plurality of historical calendar events. After step 730, the method proceeds to step 740, where the device presents the list of similar calendar events to the user. Next, at step 750, the user selects one similar calendar event from the list of similar calendar events. Finally, at step 760, the device uses the one selected similar calendar event for populating at least a second field of the new calendar event.

In one scenario, a user creates a new meeting for a group of invitees without specifying the event date and time. The user begins the scenario by creating a new calendar event without fixing the event date and time. After typing in a description for the meeting, which for example is for a design review, the calendar application responds with a list of suggested historical calendar events to copy event data from. After selecting the appropriate historical calendar event to copy from, the new calendar event is populated with a list of invitees. In one embodiment, the calendar application can use the meeting schedule of the historical calendar event to determine and suggest the date and time of the new calendar event. In one embodiment, the calendar application can suggest the first available time for all the people of the invitee list as the date and time of the new calendar event. In one embodiment, the calendar application can suggest the first few available times for all the people of the invitee list as the date and time of the new calendar event. In one embodiment, even if the user has already specified the event date and time, the calendar application can still indicate that some invitees are not available for the specified event date and time slot and further suggest the first available date and time slot for all the people on the invitee list.

In one scenario, a user creates a new calendar event without specifying the event date and time. The user begins the scenario by creating a new calendar event without fixing the event date and time. After typing in a description for the meeting, the calendar application responds with a list of suggested historical calendar events to copy event data from. After selecting the appropriate historical calendar event to copy from, the new calendar event is populated with the relevant data. In one embodiment, the calendar application can use the meeting schedule of the historical calendar event to determine and suggest the date and time of the new calendar event. In one embodiment, if the suggested date and time slot based on the historical calendar event is not available to the user, then the calendar application can suggest the first available time for the user as the date and time slot of the new calendar event. In one embodiment, the calendar application can suggest the first few available times for the user as the date and time slot of the new calendar event.

In one scenario, a user can create a new calendar event based on location. For example, the user types in a description for a new calendar event which recites "basketball at Westchester Park". Then the calendar application analyzes the description input to extract a location from the description. In one embodiment, the calendar application can use Westchester Park in the location field to scan for a list of similar calendar events from a plurality of historical calendar events. In another embodiment, the calendar application can instruct a map server to geo-code the location on a map and give a point of interest to put on the map. The calendar application can also schedule the event according to a time zone of the location. The scheduling of the event according to a time zone of the location can be very helpful in creating calendar events related to airplane flights. Airplane flights are hard to input, because it can involve going from one time zone to another time zone. If the time zone corrections are not accounted for properly, this can cause a user to miss flights involving multiple time zones. For example, the user can type in a description for a new calendar event which recites "flight out of JFK at 6 pm". The calendar application can analyze the description input to extract a location of JFK (where JFK can stand for John F. Kennedy International Airport in New York City) from the description. After automatically geo-coding JFK Airport, the calendar application can see that this is in the Eastern Time Zone, so it creates the new calendar event with an event time of 6 pm (Eastern Time Zone), instead of the default time zone for the user.

In one scenario, a user can create a new calendar event based on a person. For example, the user types in a description for a new calendar event which recites "Meeting with Kenny". Then the calendar application analyzes the description input to extract a person, Kenny, from the description. In one embodiment, the calendar application can use Kenny in the person or invitee field to scan for a list of similar calendar events from a plurality of historical calendar events. In another embodiment, the calendar application figures out who is Kenny. After that, the calendar application figures out when is the user's available time and when is Kenny's available time. Using that information, the calendar application suggests one or more meeting times for the user and Kenny. Then the user can select one of those suggested meeting times to create a new calendar event with Kenny as an invitee. In other embodiments, the calendar application can just automatically figure out when is a good time for Kenny and the user to meet and send an invitation to Kenny for a meeting (i.e., a new calendar event with Kenny as an invitee). For example, a good time can be defined as the next available time from 8 am to 5 pm Monday to Friday.

Therefore, for a description of a new calendar event based on an invitee or a person, a user can choose to pre-fill the date and time field of a new calendar event based on the date and time data of a previous (or historical) calendar event. Or the date and time field of a new calendar event can be pre-filled based not on the date and time data of a previous (or historical) calendar event. Similarly, for a description of a new calendar event based on some other event field, the date and time field of a new calendar event can be pre-filled based on the date and time data of a previous (or historical) calendar event. Or the date and time field of a new calendar event can be pre-filled based not on the date and time data of a previous (or historical) calendar event.

Copying over of date and time data from a previous (or historical) calendar event to a new calendar event entry is not always carried out, because it might not be predictive of a user's intentions or preferences. Therefore, there is a need to better predict a user's intentions and preferences through a machine learning mechanism that records and analyzes a user's historical habits or patterns. As an example, based on recording and analyzing a user's record of historical calendar events, the calendar application can figure out that a user usually only selects a certain type of calendar events on Thursday from 10 am to 2 pm, such as a design review meeting in conference room 100. Therefore, as a user types more data into the new event description, the calendar application's confidence of predicting this new calendar event increases. As an example, the user starts with "design", so this suggests a "design review meeting". Then the user adds the time (e.g., "Thurs") and location (e.g., "room 100"). Adding the time and location increases the calendar application's confidence that the user wants to "repeat" the "Thursday 10 am-2 pm design review meeting", so the calendar application suggests accordingly the historical "Thursday 10 am-2 pm design review meeting" for copying over to the new calendar event. In some sense, this is like scanning the database of historical calendar events for similar (and possibly related) events as described previously, but now the scanning uses more than one field. In particular, the calendar application is using three event fields for scanning: the title field (e.g., "design"), the time field (e.g., "Thurs"), and the location field (e.g., "room 100"). Fitting this with a machine learning algorithm, the calendar application is able to have a better confidence of predicting the user's intentions and preferences. This concept of using multiple fields and machine learning algorithm for better predictive results can be further illustrated by the following two examples. In the first example, based on historical records and machine learning, a calendar application learns that a user usually picks up the kids at 5 pm every weekday. Then the user types a new description of "at 5 pm". The calendar may or may not know at this point that it should suggest a new event of "picking up the kids at 5 pm", but the confidence increases as the user adds "Wed" (i.e., it is a weekday) and "kids" (i.e., adding multiple fields for scanning). In the second example, the user creates a new meeting by typing "Thurs @1 pm". Then the user adds the invitees "John" and "David" to the meeting. The calendar application realizes, through machine learning, that usually when the user adds "John" and "David", the user is thinking about a design review. Therefore, the calendar application suggests a design review meeting. Further, the calendar application realizes that the design review meeting room is usually conference room 1, so the calendar application suggests to the user conference room 1.

Regarding the use of a machine learning mechanism to improve the search result, one can think of each data field in a calendar event as an independent variable. Therefore, the more data fields a user can fill in and the more data the user can provide for each data field, the more confidence a calendar application has of getting a better result. For example, if a search is not just based on time and location, but is further based on an attachment or a note, the user can suggest more information, and not just time and location data. Similarly, other data fields can also be utilized to improve the search result.

Figure 8:
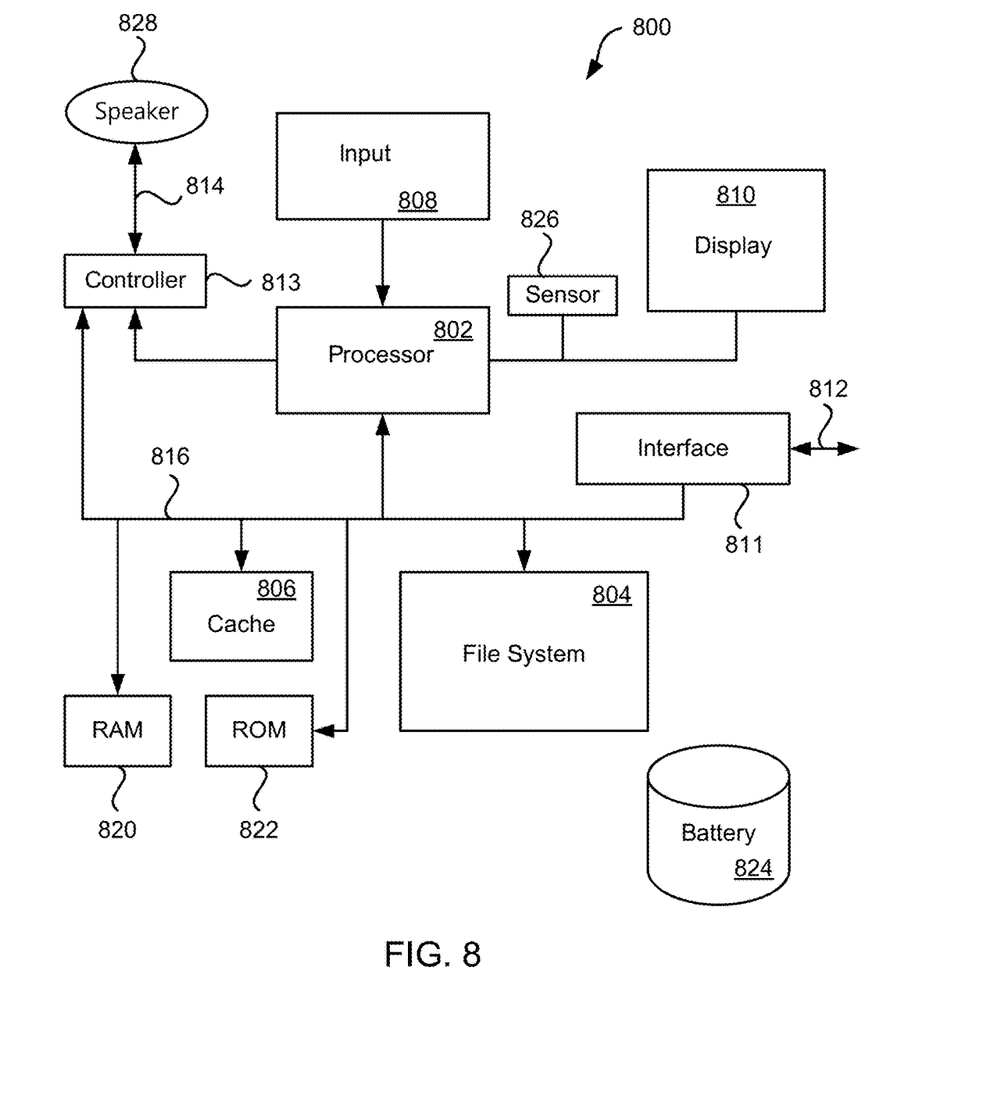
FIG. 8 shows a block diagram of an electronic device suitable for use with the described embodiments.

FIG. 8 is a block diagram of an electronic device suitable for controlling some of the processes in the described embodiment. Electronic device 800 can illustrate circuitry of a representative computing device. Electronic device 800 can include a processor 802 that pertains to a microprocessor or controller for controlling the overall operation of electronic device 800. Electronic device 800 can include instruction data pertaining to operating instructions, such as instructions for implementing and controlling a user equipment, in a file system 804 and a cache 806. File system 804 can be a storage disk or a plurality of disks. In some embodiments, file system 804 can be flash memory, semiconductor (solid state) memory or the like. The file system 804 can typically provide high capacity storage capability for the electronic device 800. However, since the access time for the file system 804 can be relatively slow (especially if file system 804 includes a mechanical disk drive), the electronic device 800 can also include cache 806. The cache 806 can include, for example, Random-Access Memory (RAM) provided by semiconductor memory. The relative access time to the cache 806 can be substantially shorter than for the file system 804. However, cache 806 may not have the large storage capacity of file system 804. Further, file system 804, when active, can consume more power than cache 806. Power consumption often can be a concern when the electronic device 800 is a portable device that is powered by battery 824. The electronic device 800 can also include a RAM 820 and a Read-Only Memory (ROM) 822. The ROM 822 can store programs, utilities or processes to be executed in a non-volatile manner. The RAM 820 can provide volatile data storage, such as for cache 806.

Electronic device 800 can also include user input device 808 that allows a user of the electronic device 800 to interact with the electronic device 800. For example, user input device 808 can take a variety of forms, such as a button, keypad, dial, touch screen, audio input interface, visual/image capture input interface, input in the form of sensor data, etc. Still further, electronic device 800 can include a display 810 (screen display) that can be controlled by processor 802 to display information, such as web pages, to the user. Data bus 816 can facilitate data transfer between at least file system 804, cache 806, processor 802, and input/output (I/O) controller 813. I/O controller 813 can be used to interface with and control different devices such as speakers, ear buds, microphone or video cameras through appropriate codecs. For example, control bus 814 can be used to control speaker 828.

Electronic device 800 can also include a network/bus interface 811 that couples to data link 812. Data link 812 can allow electronic device 800 to couple to a host computer or to accessory devices or to other networks such as the internet. The data link 812 can be provided over a wired connection or a wireless connection. In the case of a wireless connection, network/bus interface 811 can include a wireless transceiver, such as a wireless transceiver configured to transmit and receive data according to the LTE (Long Term Evolution) protocol. Sensor 826 can take the form of circuitry for detecting any number of stimuli. For example, sensor 826 can include any number of sensors for monitoring environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. Some of the described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, HDDs (hard disk drives), SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for creating a calendar event, the method comprising, at a computing device:
   receiving user input for a title of a new calendar event;
   referencing a prediction confidence in response to determining that the title matches, at least in part, a respective title of at least one historical calendar event of a plurality of historical calendar events stored by the computing device;
   presenting a set of information, based at least in part on the prediction confidence, derived from the at least one historical calendar event;
   receiving a subset of the set of information;
   extracting a location of the new calendar event based at least in part on the user input;
   receiving a geo-coded location automatically produced from a map server in response to extracting the location, wherein the map server produces the geo-coded location based at least in part on identifying the location on a map; and
   populating the new calendar event with the subset of information, wherein the subset of information includes at least one invitee and the geo-coded location.

2. The method of claim 1, wherein the set of information comprises at least one of the following:
   a start time, an end time, an event time duration, a day in a week, the at least one invitee, a calendar category, a note, and an attachment.

3. The method of claim 1, wherein the set of information comprises an event meeting time that is available for all invitees to the new calendar event.

4. The method of claim 1, wherein the
   user input further comprises at least one of: a date, a start time, and an end time.

5. The method of claim 1, wherein the subset of information further comprises at least one of the following:
   a calendar category, a note, and an attachment.

6. The method of claim 1, further comprising:
   adjusting a time associated with the new calendar event based at least in part on the geo-coded location.

7. At least one non-transitory machine-readable storage medium storing instructions that, when executed by at least one processor included in a computing device, cause the computing device to carry out steps that include:
   receiving user input for a title of a new calendar event;
   referencing a prediction confidence in response to a determination made that the title matches, at least in part, a respective title of at least one historical calendar event of a plurality of historical calendar events;
   presenting a set of information, based at least in part on the prediction confidence, derived from the at least one historical calendar event;
   receiving a subset of the set of information;
   extracting a location of the new calendar event based at least in part on the user input;
   receiving a geo-coded location automatically produced from a map server in response to extracting the location, wherein the map server produces the geo-coded location based at least in part on identifying the location on a map; and
   populating the new calendar event with the subset of information, wherein the subset of information includes at least one invitee and the geo-coded location.

8. The at least one non-transitory machine-readable storage medium of claim 7, wherein the set of information comprises at least one of the following:
   a start time, an end time, an event time duration, a day in a week, the at least one invitee, a calendar category, a note, and an attachment.

9. The at least one non-transitory machine-readable storage medium of claim 7, wherein the set of information comprises an event meeting time that is available for all invitees to the new calendar event.

10. The at least one non-transitory machine-readable storage medium of claim 7, wherein the steps further include:
    adjusting a time associated with the new calendar event based at least in part on the geo-coded location.

11. A computing device configured to create a calendar event, the computing device comprising:
    at least one processor; and
    at least one memory storing instructions that, when executed by the at least one processor, cause the device to:
    receive user input for a title of a new calendar event;
    reference a prediction confidence in response to a determination made that the title matches, at least in part, a respective title of at least one historical calendar event of a plurality of historical calendar events;
    present a set of information, based at least in part on the prediction confidence, derived from the at least one historical calendar event;
    receive a subset of the set of information;
    extract a location of the new calendar event based at least in part on the user input;
    receive a geo-coded location automatically produced from a map server in response to extracting the location, wherein the map server produces the geo-coded location based at least in part on identifying the location on a map; and
    populate the new calendar event with the subset of information, wherein the subset of information includes at least one invitee and the geo-coded location.

12. The computing device of claim 11, wherein the set of information comprises at least one of the following:
    a start time, an end time, an event time duration, a day in a week, the at least one invitee, a calendar category, a note, and an attachment.

13. The computing device of claim 11, wherein the at least one processor further causes the device to:
    present an event meeting time that is available for all invitees to the new calendar event.

14. The computing device of claim 11, wherein the
    user input further comprises at least one of: a date, a start time, and an end time.

15. The computing device of claim 11, wherein the subset of information further comprises at least one of the following:
    a calendar category, a note, and an attachment.

16. The computing device of claim 11, wherein the at least one processor further causes the device to:
    adjust a time associated with the new calendar event based at least in part on the geo-coded location.

17. The method of claim 1, wherein presenting the set of information further comprises:

comparing the title to a stored historical title;
increasing the prediction confidence in response to detecting a match between the title and the stored historical title;
responsive to increasing the prediction confidence, presenting the subset of the set of information, wherein the subset comprises:
a stored historical meeting time associated with the stored historical title, and
a stored historical meeting location associated with the stored historical title.

18. The at least one non-transitory machine-readable storage medium of claim 7, wherein the steps further include:
comparing the title to a stored historical title;
increasing the prediction confidence in response to detecting a match between the title and the stored historical title;
responsive to increasing the prediction confidence, presenting the subset of the set of information, wherein the subset comprises:
a stored historical meeting time associated with the stored historical title, and
a stored historical meeting location associated with the stored historical title.

19. The method of claim 6, wherein the time is a default time zone set for a user.

20. The at least one non-transitory machine-readable storage medium of claim 10, wherein the time is a default time zone set for a user.

* * * * *